(12) United States Patent
Jun

(10) Patent No.: US 8,837,417 B2
(45) Date of Patent: Sep. 16, 2014

(54) APPARATUS AND METHOD FOR TRANSMITTING A HOPPING PILOT BEACON SIGNAL IN A COMMUNICATION SYSTEM

(71) Applicant: Samsung Electronics Co., Ltd., Gyeonggi-do (KR)

(72) Inventor: Min-Sik Jun, Seoul (KR)

(73) Assignee: Samsung Electronics Co., Ltd (KR)

(*) Notice: Subject to any disclaimer, the term of this patent is extended or adjusted under 35 U.S.C. 154(b) by 108 days.

(21) Appl. No.: 13/647,807

(22) Filed: Oct. 9, 2012

(65) Prior Publication Data

US 2013/0089045 A1 Apr. 11, 2013

(30) Foreign Application Priority Data

Oct. 6, 2011 (KR) .................. 10-2011-0102098

(51) Int. Cl.
*H04W 4/00* (2009.01)
*H04W 72/04* (2009.01)
*H04L 5/00* (2006.01)

(52) U.S. Cl.
CPC ............. *H04L 5/00* (2013.01); *H04W 72/0453* (2013.01)
USPC ........................................................ 370/329

(58) Field of Classification Search
CPC .............. H04L 5/0048; H04L 25/0226; H04L 27/2613; H04L 25/03866; H04L 5/0016; H04J 13/16; H04J 13/0074; H04J 13/00; H04B 1/69
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS

| | | | |
|---|---|---|---|
| 7,751,304 B2* | 7/2010 | Ro et al. ..................... 370/203 |
| 8,335,503 B1* | 12/2012 | Desmond et al. .......... 455/422.1 |
| 8,498,241 B1* | 7/2013 | Talley et al. ................. 370/328 |
| 2003/0185171 A1* | 10/2003 | Mullins et al. ............... 370/329 |
| 2004/0095902 A1* | 5/2004 | Laroia et al. ................. 370/328 |
| 2004/0109432 A1* | 6/2004 | Laroia et al. ................. 370/343 |
| 2004/0228267 A1* | 11/2004 | Agrawal et al. .............. 370/203 |
| 2005/0226141 A1* | 10/2005 | Ro et al. ....................... 370/203 |
| 2009/0233605 A1* | 9/2009 | Kim ............................. 455/436 |
| 2010/0315967 A1* | 12/2010 | Patel et al. .................... 370/252 |

* cited by examiner

*Primary Examiner* — Jung-Jen Liu
(74) *Attorney, Agent, or Firm* — The Farrell Law Firm, P.C.

(57) ABSTRACT

Methods and apparatus are provided for transmitting a Hopping Pilot Beacon (HPB) in a communication system. A number of installed switches corresponds to a number of Frequency Assignments (FAs) used in the communication system. A Demultiplexer (DEMUX) connects one of a plurality of first input lines, which provide an HPB signal to each of the switches, with a corresponding one of a plurality of output lines of the switches. An HPB Multiplexer (MUX) control block controls the DEMUX to connect one of the plurality of first input lines with one of the plurality of output lines, which is connected to a Numerical Controlled Oscillator (NCO) for outputting a corresponding signal to a radio frequency terminal through a frequency of a corresponding FA.

9 Claims, 3 Drawing Sheets

US 8,837,417 B2

APPARATUS AND METHOD FOR TRANSMITTING A HOPPING PILOT BEACON SIGNAL IN A COMMUNICATION SYSTEM

PRIORITY

This application claims priority under 35 U.S.C. §119(a) to Korean Application Serial No. 10-2011-0102098, which was filed in the Korean Intellectual Property Office on Oct. 6, 2011, the content of which is incorporated herein by reference.

BACKGROUND OF THE INVENTION

1. Field of the Invention

The present invention relates generally to an apparatus and a method for transmitting a Hopping Pilot Beacon (HPB) signal in a communication system.

2. Description of the Related Art

The number of Frequency Assignments (FAs) has increased due to the increased number of subscribers. Thus, different numbers of FAs are used by base stations located in a downtown area and base stations located in a peripheral area, or even in base stations located in the same downtown area. A Pilot Beacon scheme has been used in such situations, and provides only a pilot channel without a traffic channel in order to induce a smooth handover between base stations. An object of the Pilot Beacon scheme is to notify a mobile terminal of frequency use information of a base station or a sector, to which the mobile terminal will handover, and code information and time information of a pilot channel.

A scheme involving time division multiplexing and using the Pilot Beacon signal for a plurality of frequencies, instead of consistently using the Pilot Beacon signal for a single frequency, is defined as a frequency Hopping Pilot Beacon (HPB) signal.

Typically, the number of HPB signals that are to be used for a plurality of subcarriers allocated in an entire cell, and a subcarrier-set available for each HPB signal, may be determined based on a system bandwidth. Each HPB signal may be mapped to one subcarrier in a subcarrier-set in each symbol period, during which the HPB signal is transmitted. The mapped subcarrier may be determined based on a pilot beacon hopping pattern or a pilot beacon code, and may depend on a cell identifier and/or other information being transmitted through the pilot beacon signal.

SUMMARY OF THE INVENTION

The present invention has been made to address at least the above problems and/or disadvantages and to provide at least the advantages described below. Accordingly, an aspect of the present invention provides an apparatus and a method for transmitting an HPB signal in a communication system.

In accordance with an aspect of the present invention, an apparatus is provided for transmitting an HPB in a communication system. The apparatus includes switches. A number of the switches corresponds to a number of FAs used in the communication system. The apparatus also includes a Demultiplexer (DEMUX) for connecting one of a plurality of first input lines, which provides an HPB signal to each of the switches, with a corresponding one of a plurality of output lines of the switches. The apparatus additionally includes an HPB Multiplexer (MUX) control block for receiving the HPB signal and information of the HPB signal from an upper board, acquiring frequency information from the HPB signal, selecting a switch, from among the switches, having a second input line through which a frequency, corresponding to a particular FA from among the FAs, is input, and controlling the DEMUX to connect a first input line of the switch with an output line of the switch. The particular FA corresponds to the frequency information from the HPB signal. The apparatus further includes a Numerical Controlled Oscillator (NCO) connected with the output line of the switch to output the HPB signal to a radio frequency terminal through the particular FA.

In accordance with another aspect of the present invention, a method of designing an HPB in a communication system is provided. Switches are installed. A number of switches corresponds to a number of FAs used in the communication system. A DEMUX is installed for connecting one of a plurality of first input lines, which provide an HPB signal to each of the switches, with a corresponding one of a plurality of output lines of the switches. An HPB MUX control block is installed for controlling the DEMUX to connect one of the plurality of first input lines with one of the plurality of output lines, which is connected to an NCO for outputting a corresponding signal to a radio frequency terminal through a frequency of a corresponding FA.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
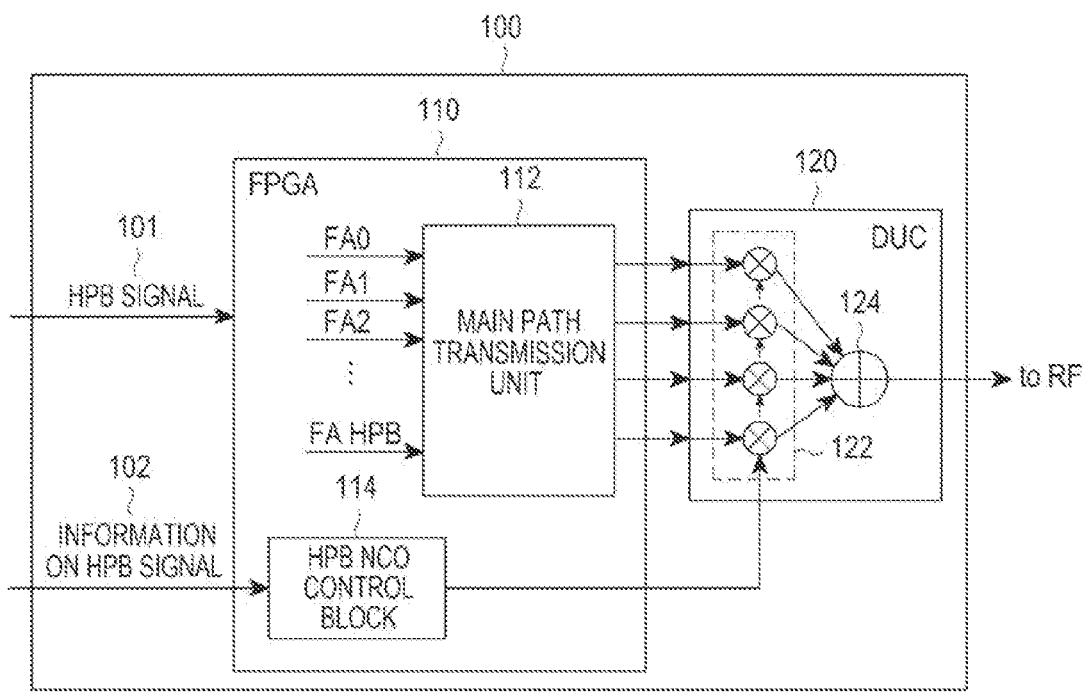
FIG. 1 is a diagram illustrating an HPB signal transmission apparatus.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention provide an apparatus and a method for transmitting an HPB signal while maintaining the number of NCOs, which corresponds to the number of FAs to be accommodated in an RF path, without additionally including a separate NCO for the HPB signal in the HPB signal transmission apparatus. Therefore, embodiments of the present invention can simultaneously generate a plurality of HPBs by using an existing construction, thereby reducing the cost, and reducing an interface between a Field Programmable Gate Array (FPGA) and a Digital Up-Converter (DUC).

FIG. 1 is a diagram illustrating an HPB signal transmission apparatus.

Referring to FIG. 1, an HPB signal transmission apparatus 100 includes an FPGA 110 and a DUC 120.

The FPGA 110 includes a main path transmission unit 112 in which NCOs 122 located in the DUC 120 are respectively mapped to FAs. The FGPA 110 also includes an HPB NCO control block 114. The DUC 120 includes a summer 124 and the NCOs 122, the number of which corresponds to the number of the FAs. The NCOs 122 of the DUC 1120 include NCOs respectively mapped to FAs used in a corresponding communication system, and an NCO mapped to an FA for an HPB signal.

The HPB signal transmission apparatus 100 receives an HPB signal 101 and information 102 on the HPB signal from an upper board. The information 102 on the HPB signal includes a frequency, a position, and a length of the HPB signal.

The HNB NCO control block 114 acquires frequency information of the HPB signal 101 using the information 102 on the HPB signal. Further, the HNB NCO control block 114 controls input of the HPB signal 101 to one of the NCOs 122 corresponding to the FA for an HPB signal, based on the frequency information, instead of the available FAs. The HPB signal 101 is output to a Radio Frequency (RF) terminal through a transmission path of a frequency mapped to the NCO by the NCO.

An HPB signal transmission apparatus may further include another of the NCOs 122 corresponding to the FA for an HPB signal, in addition to NCOs corresponding to FAs used in the corresponding communication system. However, when traffic to be transmitted is increased, the number of subcarriers that have to be accommodated in the RF terminal is increased. Therefore, in the DUC 120, the number of the NCOs 122 should be increased in accordance with the number of the subcarriers. An HPB signal generating apparatus configured as described above requires the addition of an NCO to be used for transmission of the HPB signal, to the already installed NCOs, the number of which corresponds to the number of available FAs. Further, when a plurality of HPB signals should be transmitted simultaneously, it is required to add the same number of NCOs as the number of the HPB signals.

Therefore, embodiments of the present invention provide an apparatus and a method for transmitting at least one HPB signal while maintaining the number of already existing NCOs, without installing an additional NCO for an HPB signal.

Figure 2:
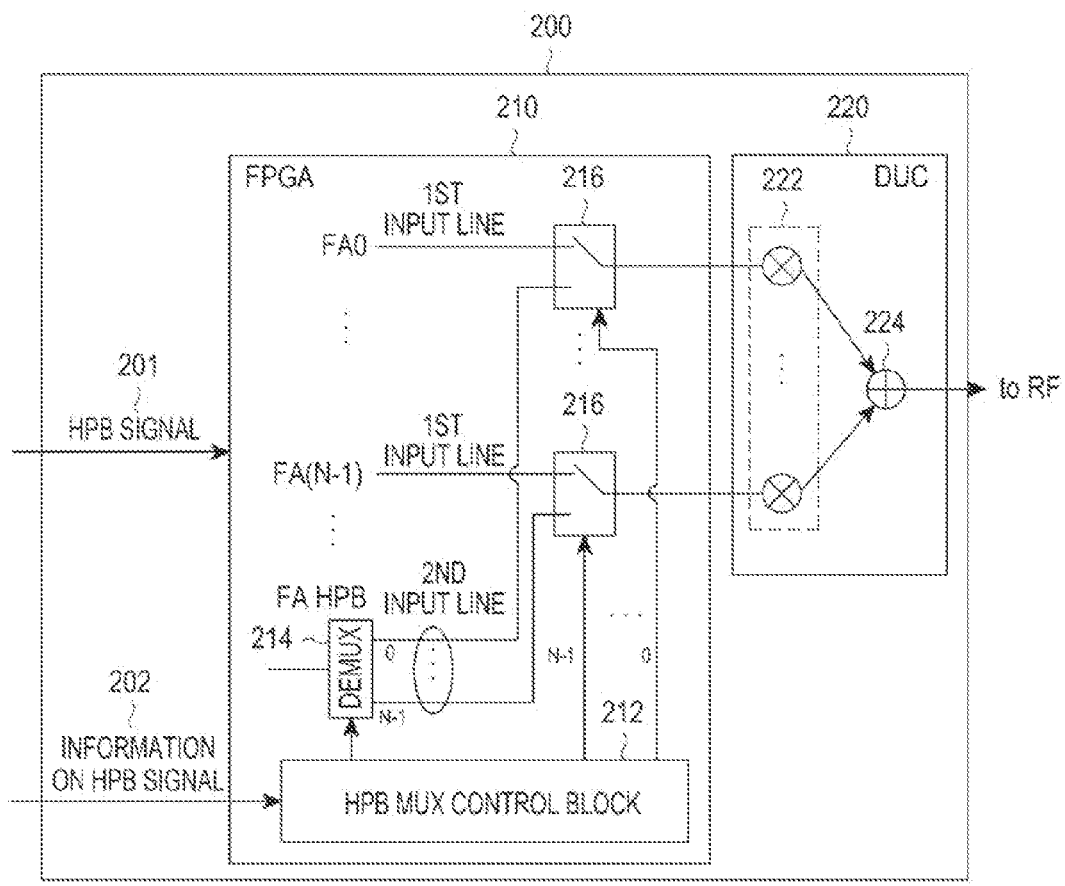
FIG. 2 is a diagram illustrating an HPB signal transmission apparatus, according to an embodiment of the present invention.

FIG. 2 is a diagram illustrating an HPB signal transmission apparatus, according to an embodiment of the present invention.

Referring to FIG. 2, an HPB signal transmission apparatus 200 includes an FPGA 210 and a DUC 220.

The FPGA 210 includes switches 216 for using at least one NCO, among a predetermined number of NCOs 222 located in the DUC 220, which corresponds to the number of FAs used in the corresponding communication system. The at least one NCO is used for an HPB signal. The FPGA 210 also includes a DEMUX 214 for selecting at least one FA among the FAs, and for connecting the selected FA with the switches 216. The FPGA 210 further includes an HPB MUX control block 212 for controlling the switches 216 and the DEMUX 214.

The HPB MUX control block 212 receives an HPB signal 201 and information 202 on the HPB signal from an upper board. The information 202 on the HPB signal includes a frequency, a position, and a length of the HPB signal 201.

Each of the switches 216 includes a first input line through which one of the FAs is input, a second input line through which the HPB signal 201 is input through the DEMUX 214, and an output line connected to one of the NCOs 222.

The HPB MUX control block 212 acquires frequency information of the HPB signal 201 by using the information 202 on the HPB signal. The HPB MUX control block 212 identifies a switch to which an FA, which corresponds to the frequency information, from among the FAs, is input through the DEMUX 214. Further, the HPB MUX control block 212 switches off a first input line of the identified switch and connects a second input line of the identified switch, with an output line connected to an NCO of the identified switch.

The HPB signal transmission apparatus 200 configured as described above may transmit an HPB signal to an RF terminal using only the NCOs 222, the number of which corresponds to the number of already installed FAs, without installing an additional NCO to which an FA for an HPB signal is mapped. Therefore, it is possible to save the costs of additionally installing the NCO and to reduce an interface between the FPGA 210 and the DUC 220.

Figure 3:
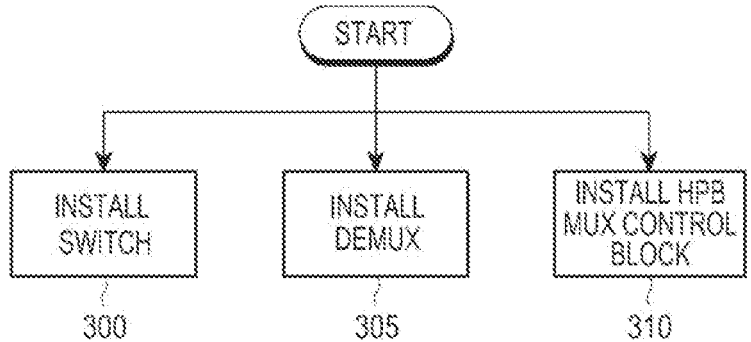
FIG. 3 is a flowchart diagram illustrating the design of an HPB transmission apparatus, according to an embodiment of the present invention.

FIG. 3 is a flowchart illustrating an HPB transmission apparatus, according to an embodiment of the present invention. The operation order provided in FIG. 3 is used to show a construction of an HPB transmission apparatus, and embodiments of the present invention are not limited to the specific order that is illustrated. Referring to FIG. 3, in step 300, switches are installed. The number of switches corresponds to the number of FAs.

In step 305, a DEMUX is installed. The DEMUX connects a first input line of each of the switches with an NCO mapped to an output line of the switch. Each of the switches includes a first input line through which an FA, from among the FAs, is input, and a second input line through which an HPB signal is input.

In step 310, an HPB MUX control block is installed. The HPB MUX control block controls the switches and the DEMUX.

Figure 4:
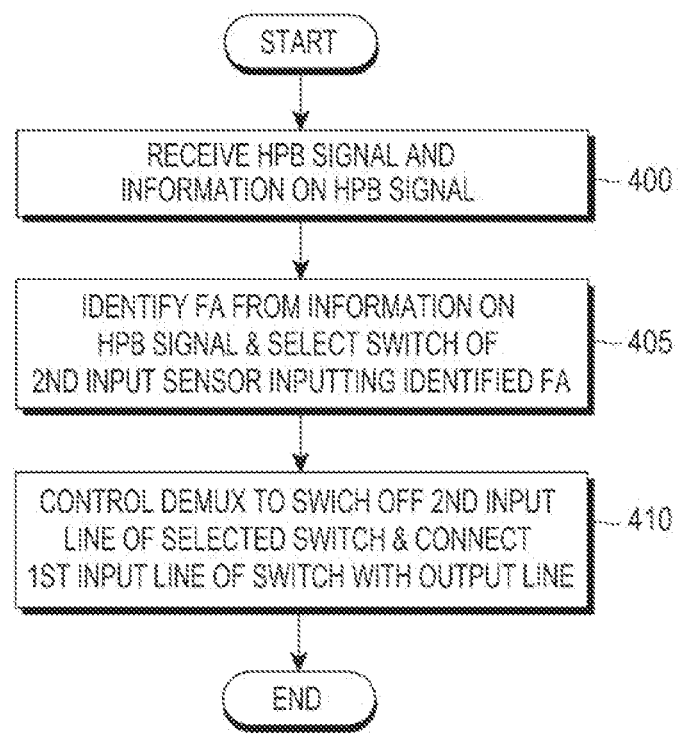
FIG. 4 is a flowchart illustrating operations of an HPB MUX control block of an installed HPB transmission apparatus, according to an embodiment of the present invention.

FIG. 4 is a flowchart illustrating operations of an HPB MUX control block of an HPB transmission apparatus, according to an embodiment of the present invention.

Referring to FIG. 4, an HPB MUX control block receives an HPB signal and information on the HPB signal from an upper board, in step 400.

In step 405, the HPB MUX control block identifies at least one FA corresponding to frequency information acquired from information of the HPB signal, and selects at least one switch having a first input line through which the identified FA is input.

In step 410, the HPB MUX control block controls the DEMUX to switch off the first input line of the switch and connect a second input line of the switch, with an NCO connected to an output line of the switch.

Thereafter, the HPB signal is output to the RF terminal through the FA mapped to the NCO, by the NCO.

Embodiments of the present invention provide an HPB signal transmission apparatus that includes a switch by which either available FAs or an HPB signal may be connected to each of the existing NCOs, an HPB MUX control block determines an input of the switch, and a DEMUX that connects an input of a corresponding switch to a corresponding NCO according to an instruction of the HPB MUX control block. As a result, the HPB signal transmission apparatus can transmit at least one HPB signal through a frequency corresponding to the HPB signal using the number of already existing NCOs.

While the invention has been shown and described with reference to certain embodiments thereof, it will be understood by those skilled in the art that various changes in form and detail may be made therein without departing from the spirit and scope of the invention as defined by the appended claims.

What is claimed is:

1. An apparatus for transmitting a Hopping Pilot Beacon (HPB) in a communication system, the apparatus comprising:
   switches, wherein a number of the switches corresponds to a number of Frequency Assignments (FAs) used in the communication system;
   a Demultiplexer (DEMUX) for connecting one of a plurality of first input lines, which provides an HPB signal to each of the switches, with a corresponding one of a plurality of output lines of the switches;
   an HPB Multiplexer (MUX) control block for receiving the HPB signal and information of the HPB signal from an upper board, acquiring frequency information from the HPB signal, selecting a switch, from among the switches, having a second input line through which a frequency, corresponding to a particular FA from among the FAs, is input, and controlling the DEMUX to connect a first input line of the switch with an output line of the switch, wherein the particular FA corresponds to the frequency information from the HPB signal; and
   a Numerical Controlled Oscillator (NCO) connected with the output line of the switch to output the HPB signal to a radio frequency terminal through the particular FA.

2. The apparatus of claim 1, wherein the HPB MUX control block controls the DEMUX to switch off the second input line of the switch and connect the first input line of the switch with the output line of the switch.

3. The apparatus of claim 1, wherein each of the switches comprises a second input line through which a frequency, corresponding to an FA from among the FAs, is input.

4. The apparatus of claim 1, wherein information of the HPB signal comprises a frequency, a position, and a length of the HPB signal.

5. A method of designing a Hopping Pilot Beacon (HPB) in a communication system, the method comprising the steps of:
   installing switches, wherein a number of switches corresponds to a number of Frequency Assignments (FAs) used in the communication system;
   installing a Demultiplexer (DEMUX) for connecting one of a plurality of first input lines, which provide an HPB signal to each of the switches, with a corresponding one of a plurality of output lines of the switches;
   installing an HPB Multiplexer (MUX) control block for controlling the DEMUX to connect one of the plurality of first input lines with one of the plurality of output lines, which is connected to a Numerical Controlled Oscillator (NCO) for outputting a corresponding signal to a radio frequency terminal through a frequency of a corresponding FA:
   receiving the HPB signal and information of the HPB signal from an upper board at the HPB MUX control block; and
   controlling, by the HPB MUX control block, the DEMUX to connect a first input line of a switch with an output line of the switch.

6. The method of claim 5, further comprising:
   acquiring frequency information from the HPB signal; and
   selecting, by the HPB MUX control block, the switch, from among the switches, having a second input line through which a frequency, corresponding to a particular FA from among the FAs, is input, wherein the particular FA corresponds to the frequency information from the HPB signal.

7. The method of claim 6, further comprising:
   controlling, by the HPB MUX control block, the DEMUX to switch off the second input line of the switch and connect the first input line of the switch with the output line of the switch.

8. The method of claim 5, wherein each of the switches comprises a second input line through which a frequency, corresponding to an FA from among the FAs, is input.

9. The method of claim 5, wherein information of the HPB signal comprises a frequency, a position, and a length of the HPB signal.

* * * * *